March 23, 1965 L. H. ENLOE 3,175,216

COMMUNICATION STATION EMPLOYING ANTENNA ARRAY

Filed Aug. 28, 1962 3 Sheets-Sheet 1

INVENTOR
L. H. ENLOE
BY
ATTORNEY

March 23, 1965 L. H. ENLOE 3,175,216

COMMUNICATION STATION EMPLOYING ANTENNA ARRAY

Filed Aug. 28, 1962 3 Sheets-Sheet 2

INVENTOR
L. H. ENLOE
BY
ATTORNEY

INVENTOR
L. H. ENLOE
BY
ATTORNEY

United States Patent Office 3,175,216
Patented Mar. 23, 1965

3,175,216
COMMUNICATION STATION EMPLOYING ANTENNA ARRAY

Louis H. Enloe, Marlboro, N.J., assignor to Bell Telephone Laboratories, Incorporated, New York, N.Y., a corporation of New York Filed Aug. 28, 1962, Ser. No. 220,010
10 Claims. (Cl. 343—100)

This invention relates to communication systems and, more particularly, to an improved communication station employing a self-steering antenna array.

A patent application of C. C. Cutler, R. Kompfner, and L. C. Tillotson, Serial No. 162,165, filed December 26, 1961, and assigned to the assignee of this application, describes a communication station employing an antenna array that directionally transmits radio waves toward remotely located sources of radio waves irradiating the array. This system achieves self-steering performance by means of a series of mixing and filtering operations repeated in each antenna element of the array. As part of the operation, pilot signals are called for, each taking the form of an unmodulated signal, i.e., a pure sine wave, bearing the phase characteristics of the portion of the portion of the radio wave intercepted from the remote source by a different antenna element. The relative phases of these pilots are inverted in sense, mixed individually with information to be transmitted to the remote source, thus imparting the phase characteristics to the information signal, and the resulting sidebands applied to their respective antenna elements phased properly for directional transmission toward the remote source.

Because the Cutler-Kompfner-Tillotson arrangement is completely electronic in operation many diverse applications have been envisaged for it. For example, a communications satellite utilizing the Cutler-Kompfner-Tillotson system would be capable of carrying on directional communications with Earth and the exercise of little or no control over the satellite orientation would be necessary. Such a communication station could, as a repeater, form links in a cross-country directional radio relay system, in which case horizontal stability of the towers for mounting the antennas is not at all critical. In fact, mounting structures as flexible as ordinary telephone poles could be used. Moreover, this system could replace the larger paraboloidal and horn reflector antennas presently used to scan and track moving bodies, thus eliminating the requirement of small structural tolerances necessary to achieve higher directionality with single element antennas. Mobile radio is another application where the features of the Cutler-Kompfner-Tillotson system could be put to good use.

In the above-mentioned Cutler-Kompfner-Tillotson application, two alternative arrangements are disclosed for making pilots available at the array. The first, transmission of a pilot signal from the remote source might be objectionable in some instances in that it necessitates allocation of additional frequency space to accommodate the pilot. The second involves filtering, for use as pilots, the carrier frequency power from portions of the modulated signals received. In large index frequency modulation systems, however, only a small portion of the total power of the modulated signal is situated at the carrier frequency. Thus, the second alternative might be found impracticable where such mode of transmission is contemplated.

Hence, it is the object of this invention to improve the Cutler-Kompfner-Tillotson self-steering array system, particularly in the development of pilot signals used to phase the array elements.

In accordance with the above object, a communication station having an antenna system comprising an array of antenna elements is irradiated by a modulated radio wave from a remote source. A reference signal to be mixed with the portions of the modulated radio wave intercepted by the antenna elements is derived from the portion of the modulated radio wave intercepted by a selected one of the elements. As a result, the modulation carried by the radio wave is canceled in a selected sideband of each mixing operation and pilot signals bearing the phase characteristics of the portions of the wave intercepted by the antenna elements are produced.

More specifically, a portion of the radio wave intercepted by one antenna element is mixed with the output from a local oscillator and the resulting sum frequency sideband is used as a reference signal to be mixed with the portion of the radio wave intercepted by each of the remaining antenna elements. The difference frequency sideband resulting from each of the last-mentioned mixing operations is free of modulation and bears a phase characteristic that is inverse or opposite in sense to the phase characteristic of the portion of the radio wave intercepted by the antenna element. This difference frequency sideband is, according to Cutler-Kompfner-Tillotson's teachings, mixed with the intercepted portion of the radio wave, the resultant difference frequency sideband being in phase with the portions of the radio wave intercepted by all the other antenna elements, and is combined with similar signals derived from the portions of the radio wave received by the other elements. This difference frequency sideband is also mixed with information to be radiated toward the remote source, thus phasing the signals radiated from the antennas to provoke directional transmission toward the remote source. The described arrangement results in no increase in circuit complexity over the Cutler-Kompfner-Tillotson system.

As an additional feature, a fail safe circuit is provided which substitutes a spare source of reference signals for the regular one, either when the antenna of the regular source is not in position to intercept the impinging radio wave, as might occur in a satellite communication system, or when component failure occurs.

The above and other features of the invention will be considered in the following detailed description taken in conjunction with the drawings in which.

Generally, when a radio wave impinges upon an antenna array the portions of the wave intercepted by the elements of the array differ in phase by amounts dependent upon the angle of incidence of the wave and the location of the elements of the array. In order to transmit a radio wave of the same frequency from the array in the direction to the source of the impinging wave, reciprocity dictates that the phase differences between the individual signals radiated from the antenna elements must be equal in magnitude to and opposite in sense from the phase differences between the portions of the incoming wave intercepted by the antenna elements.

In the following discussion only the phase and frequency of the electrical signals involved are of interest. The signals considered will be expressed in the general form $e^{j(\omega t+\theta)}$, commonly used in electrical circuit analysis, and the amplitude term will be dispensed with. In the above expression, $\omega$ equals $2\pi$ times the frequency of the signal represented, $t$ equals time, and $\theta$ equals the phase of the signal relative to an arbitrary reference. It will be understood that what is actually meant by the designation is either the real or imaginary part of the above expression.

Figure 2:
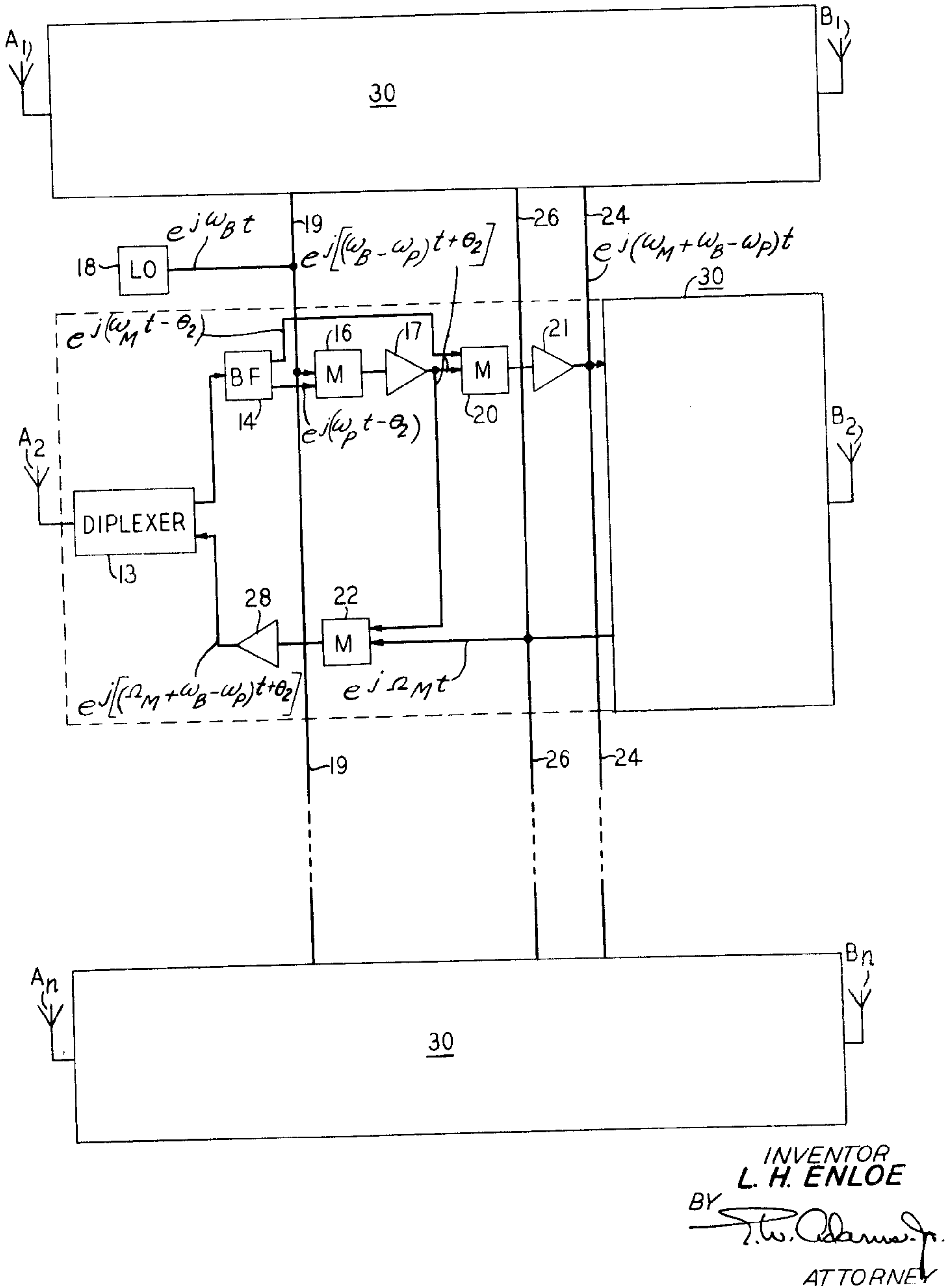
FIG. 2 PRIOR ART
FIG. 2 is a schematic diagram in block form of a communications repeater disclosed in the above-mentioned Cutler-Kompfner-Tillotson application.

A repeater disclosed in the Cutler-Kompfner-Tillotson application that satisfies the above conditions for self-steering antenna array performance by means of modulation techniques is shown in FIG. 2. Each of two antenna arrays comprising antenna elements $A_1, A_2, \ldots A_n$ and $B_1, B_2 \ldots B_n$ respectively, communicate with a different remote source of radio waves (not shown). The elements of one array are interconnected to the corresponding elements of the other array by identical circuitry, shown for example in the center one of blocks 30. Antenna element $A_2$, selected as exemplary, extracts a portion of the radio wave impinging upon the array of which it is a part, represented by $e^{j(\omega_M t-\theta_2)}$ and $e^{j(\omega_P t-\theta_2)}$ where $\omega_M$ equals $2\pi$ times the center frequency of the modulated signal, $\omega_P$ equals $2\pi$ times the frequency of the pilot signal, and $\theta_2$ equals the phase of the portion of the wave intercepted by antenna element $A_2$ relative to the portion intercepted by element $A_1$. A branching filter 14 at the output of a diplexer 13 separates the modulation signal, $e^{j(\omega_P t-\theta_2)}$, and the pilot signal, $e^{j(\omega_P t-\theta_2)}$ recovered by antenna element $A_2$, the latter being beat in a mixer 16 with the output of a local oscillator 18 $e^{j\omega_B t}$, where $\omega_B$ equals $2\pi$ times the frequency of local oscillator 18 and is larger than $\omega_M$. A bus 19 also distributes the output of oscillator 18 to blocks 30 associated with the other elements where similar beating operations take place. The difference frequency sideband produced by mixer 16, represented by $e^{j[(\omega_B-\omega_P)t+\theta_2]}$, is amplified and isolated by a narrow band amplifier 17 and applied to both mixers 20 and 22. It will be noted that the phase of the output from amplifier 17 has been inverted, i.e., it is opposite in sense to the phase of the portion of the radio wave intercepted by antenna element $A_2$. In mixer 20 the modulation signal recovered by antenna element $A_2$ is mixed with the output from amplifier 17. The resulting sum frequency sideband, separated and amplified by a narrow band amplifier 21 and represented by $e^{j(\omega_M+\omega_B-\omega_P)t}$, is free of its relative phase angle. This means it is in phase with comparable signals derived from the portions intercepted by element $A_1$ and the remaining elements of the array and is combined therewith on a bus 24.

In mixer 22 the output from amplifier 17 is mixed with an information signal appearing on a bus 26 and represented by $e^{j\Omega_M t}$, where $\Omega_M$ equals $2\pi$ times the center frequency of the modulated signal and the resulting sum frequency sideband, represented by $e^{j[(\Omega_M+\omega_B-\omega_P)t+\theta_2]}$, is separated and amplified in a narrow band amplifier 28. This signal, which is designed to be substantially equal in frequency to the radio wave impinging upon the array, has a phase angle equal in magnitude and opposite in sense to the portion of the radio wave intercepted by antenna element $A_2$ and is applied through diplexer 13 to antenna element $A_2$ for radiation therefrom. As the phase angles of the signals radiated from the other antenna elements of the array are also each equal and opposite to the portion of the radio wave intercepted by their respective antenna elements, directional transmission occurs toward the source of radio waves impinging upon the array.

The pilot signal serves two purposes after phase inversion by mixer 16. It is beat with the portion of the radio wave intercepted by antenna element $A_2$ in mixer 20 to produce the information carried by the radio wave in phase with similar quantities derived from the other elements of the array. It is also beat in mixer 22 with information to be transmitted from antenna elements $A_1, A_2 \ldots A_n$ to phase these signals properly for transmission toward the remote source of information. Both of these uses normally call for a pilot signal which is unmodulated so as not to interfere with the information with which it is mixed.

The information appearing on bus 24 can be radiated from the antenna elements $B_1, B_2 \ldots B_n$ and the information appearing on bus 26 processed from portions of the radio wave intercepted by elements $B_1, B_2 \ldots B_n$ to round out the repeater by duplication of components 13, 14, 16, 17, 18, 20, 21, 22, and 28 in the right portion of block 30. If the communication station shown is to be a terminal station rather than a repeater, the information appearing on bus 24 would be applied to a load circuit and the information appearing on bus 26 would be supplied from a local source rather than from a radio wave intercepted by antenna elements $B_1, B_2, \ldots B_n$. The Cutler-Kompfner-Tillotson application discloses several arrangements that adapt the repeater shown for transmission of frequencies varying greatly from the frequencies of the received wave.

Figure 1:
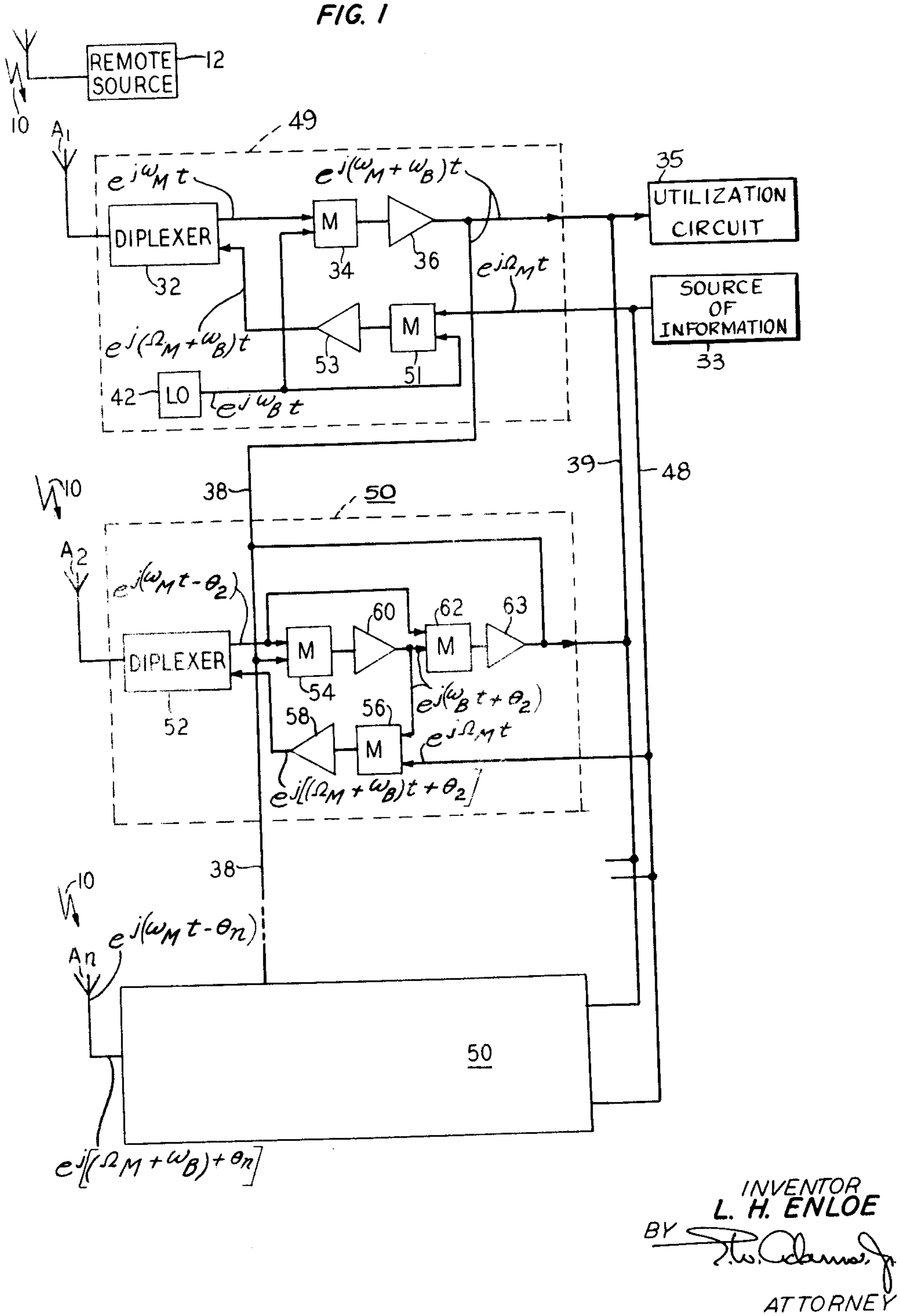
FIG. 1 is a schematic diagram in block form of a communication system embodying the invention.

In FIG. 1 is disclosed a modification of the prior art communcation station illustrated in FIG. 2 embodying the principles of the invention. Radio waves, labeled 10, from a remote source 12 irradiate an array comprising antenna element $A_1, A_2, \ldots A_n$. One of the antenna elements, designated $A_1$, is interconnected to circuitry shown in block 49. Other circuitry shown in blocks 50, identical to each other in structure, are interconnected to corresponding elements of the array. A portion of the radio wave from remote source 12 intercepted by antenna element $A_1$, is represented by $e^{j\omega_M t}$. The signals associated with block 49 are treated for convenience as the references to which the phases of the signals associated with blocks 50 will be compared. This portion passes through a diplexer 32 and is beat with the output from a local oscillator 42, represented by $e^{j\omega_B t}$. In contradistinction to the prior art circuit of FIG. 2, no pilot signal is radiated from remote source 12 and the output from local oscillator 42 is mixed only with the portion of the radio wave intercepted by antenna element $A_1$ (not the portions intercepted by antenna elements $A_2$ through $A_n$). The frequency of local oscillator 42 is not limited in any way by that of the impinging wave, as is the case in the prior art system. The sum frequency modulation sideband generated by mixer 34, represented by $e^{j(\omega_M+\omega_B)t}$, is separated and amplified by a narrow band amplifier 36 and then applied to a bus 38 for application to blocks 50 and to a utilization circuit 35. Information from a source 33, represented by $e^{j\Omega_M t}$ and appearing on a bus 48, is beat with the output of local oscillator 42 in a mixer 51. The resulting sum frequency sideband, represented by $e^{j(\Omega_M+\omega_B)t}$, is isolated and amplified in a narrow band amplifier 53 for application to antenna $A_1$ via diplexer 32.

A portion of the radio wave intercepted by antenna element $A_2$, represented by $e^{j(\omega_M t-\theta_2)}$, where $\theta_2$ equals the phase difference between the portion of the radio wave intercepted by antenna element $A_2$ and the portion intercepted by element $A_1$, is applied through a diplexer 52 to a mixer 54 where it is mixed with the signal appearing on bus 38. In the difference frequency sideband, represented by $e^{j(\omega_B t+\theta_2)}$, the modulation carried by the impinging wave has been canceled and a sine wave signal results having the phase characteristic of the portion of the wave intercepted by element $A_2$ inverted in sense. This signal is separated and amplified by a narrow band amplifier 60 and employed to carry out the functions that the pilot signal of the Cutler-Kompfner-Tillotson system performs. It is simultaneously applied to mixers 62 and 56. In mixer 62 this signal is mixed with a portion of the wave intercepted by antenna element $A_2$ and the sum frequency sideband produced thereby, equal in frequency to and in phase with the signal fed to a bus 39, is amplified and isolated by an amplifier 63. The output from amplifier 63 is connected to bus 39 and therefore contributes to the resultant signal applied by bus 39 to utilization circuit 35. In mixer 56 the output from amplifier 60 is mixed with the information appearing on bus 48 and the sum frequency, represented by $$e^{j[(\Omega_M+\omega_B)t+\theta_2]}$$

is amplified and isolated by an amplifier 58. This sideband, designed to be approximately the same frequency as the impinging wave, is equal and opposite in phase to the portion of the impinging wave abstracted by element $A_2$ and is radiated from antenna element $A_2$ after passing through diplexer 52. In this manner signals to be radiated are developed by each of blocks 50. Thus, the conditions for self-steering array performance are met and the information appearing on bus 48 is transmitted directionally toward remote source 12. Source 33 and utilization device 35 can in practice comprise a second antenna array, one element of which is associated with circuitry identical to that shown in block 49 and each of the other elements of which is associated with circuitry identical to that shown in block 50.

Figure 3:
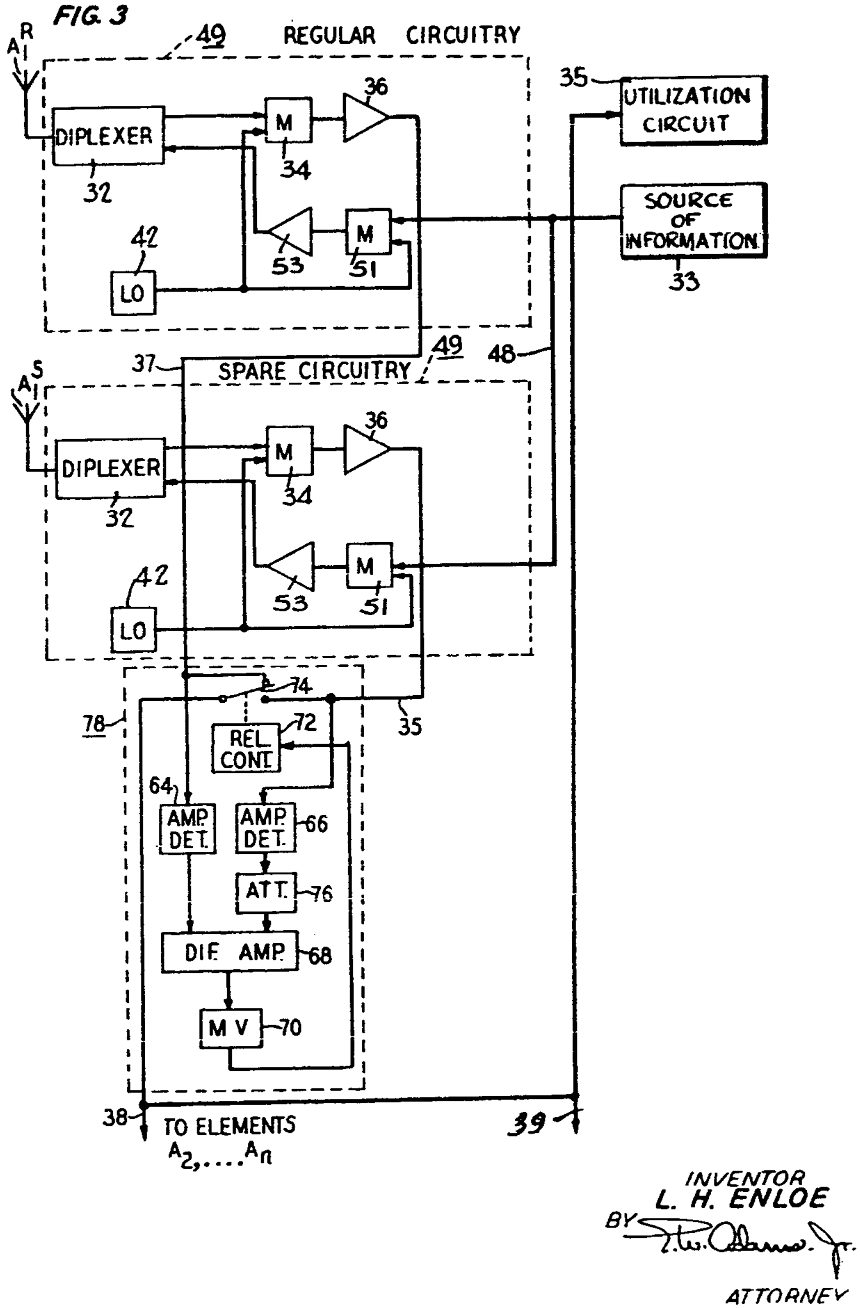
FIG. 3 is a schematic diagram in block form of a fail safe arrangement for the system of FIG. 1.

FIG. 3 illustrates a fail safe arrangement for the repeater of FIG. 1. If the antenna element chosen to provide the reference signal of the arrangement in FIG. 1 fails to intercept the impinging radio wave owing to its position relative to the source of the impinging radio wave, as might occur in satellite communication applications, or if local oscillator 42 or some other component in block 49 becomes inoperative, the entire communication station is disabled. To protect against and reduce the possibility of failure of the system, duplicate circuits, each of which is identical to that shown in block 49 of FIG. 1, are employed in the arrangement of FIG. 3. In a control block 78 amplitude detectors 64 and 66 sample the outputs from amplifiers 36 in regular and spare circuitry blocks 49 of FIG. 3, respectively, and convert these samples into direct-current indications. The outputs of amplitude detectors 64 and 66 are applied to the inputs of a difference amplifier 68 the output of which is connected to a multivibrator 70 and arranged by its polarity to control the stability state of multivibrator 70. When the level of the signal at the output of mixer 34 of the regular circuitry falls below some preselected value (determined by an attenuator 76 disposed between amplitude detector 66 and difference amplifier 68), the output of difference amplifier 68 changes polarity in recognition of this fact, thus triggering multivibrator 70 to actuate a control winding 72 of a relay 74. The relay then disconnects the regular circuitry, linked to bus 38 by a lead 37, from bus 38 and replaces it with the spare circuitry, linked to bus 38 by a lead 35, thus permitting the continuation of normal operation in the face of component failure or insufficient exposure of the antenna element of the regular circuitry to the impinging radio wave.

The invention may be practiced in any of the embodiments disclosed in the Cutler-Kompfner-Tillotson application.

What is claimed is:

1. In a communication system, an array of antenna elements, a remote source of electromagnetic waves for irradiating said array, a source of signals to be radiated from said array toward said remote source, a local signal source, means for abstracting a portion of the electromagnetic wave from said remote source intercepted by one element of said array, first means for mixing said abstracted portion from said one element with the output from said local source, second means for mixing one of the sidebands produced by said first mixing means with a portion of the wave from said remote source intercepted by each of the remainder of the elements of said array, third means for mixing a sideband from each of said second mixing means oscillating at the frequency of said output of said local source with a portion of the signal from said source of signals to be radiated to said remote source, means for applying to each of said antenna elements a sideband from said third mixing means the phase of which is opposite in sense and related in magnitude to the phase of the portion of the wave intercepted by said element, fourth means for mixing one of the sidebands produced by each of said second mixing means with a portion of the wave intercepted by the corresponding antenna element, and means for combining sidebands from said fourth mixing means that are in phase.

2. In a communication system, an array of antenna elements, a remote source of electromagnetic waves for irradiating said array, a local signal source, means for abstracting a portion of the electromagnetic wave from said remote source intercepted by one element of said array, first means for mixing said abstracted portion from said one element with the output from said local source, second means for mixing one of the sidebands produced by said first mixing means with a portion of the wave from said remote source intercepted by each of the remainder of the elements of said array, third means for mixing one of the sidebands produced by each of said second mixing means with a portion of the wave intercepted by the corresponding antenna element, and means for combining sidebands from said third mixing means that are in phase.

3. In a communication system, an array of antenna elements, a remote source of electromagnetic waves for irradiating said array, a source of signals to be radiated from said array toward said remote source, a local signal source, means for abstracting a portion of the electromagnetic wave from said remote source intercepted by one element of said array, first means for mixing said abstracted portion from said one element with the output from said local source, second means for mixing one of the sidebands produced by said first mixing means with a portion of the wave from said remote source intercepted by each of the remainder of the elements of said array, third means for mixing a sideband from each of said second mixing means oscillating at the frequency of said output of said local source with a portion of the signal from said source of signals to be radiated to said remote source, and means for applying to each of said antenna elements a sideband from said third mixing means the phase of which is opposite in sense and related in magnitude to the phase of the portion of the wave intercepted by said element.

4. A communication system comprising an antenna array, a remotely located source of electromagnetic waves impinging upon said array, a source of information to be transmitted from said array to said remotely located source, utilization means for said impinging waves, a local source of pilot signals, means for mixing said pilot signal with a portion of the electromagnetic wave from said remotely located source intercepted by one element of said array, and apparatus individual to each element of said array with the exception of said one element comprising first means for mixing one of the sidebands produced by said last-mentioned mixing means with a portion of electromagnetic wave from said remotely located source intercepted by said antenna element, means for separating a sideband produced by said first mixing means oscillating at the frequency of said pilot signal, second means for mixing said separated sideband with the output from said source of information, means for transmitting from said element a sideband from said second mixing means the relative phase of which is opposite in sense and proportional in magnitude, in the ratio of frequency of impinging wave to frequency of transmitted wave, to the phase of said intercepted portion of said impinging wave, third means for mixing a portion of said wave intercepted by said element with one of the sidebands produced by said first mixing means, and means for applying a sideband produced by said third mixing means that is in phase with sidebands produced by said third mixing means associated with the other antenna elements to said utilization means.

5. A communication system comprising an antenna array, a remotely located source of electromagnetic waves impinging upon said array, utilization means for said impinging waves, a local source of pilot signals, means for mixing said pilot signal with a portion of the electromagnetic wave from said remotely located source intercepted by one element of said array, and apparatus individual to each element of said array with the exception of said one element comprising first means for mixing one of the sidebands produced by said last-mentioned mixing means with a portion of electromagnetic wave from said remotely located source intercepted by said antenna element, means for separating a sideband produced by said first mixing means oscillating at the frequency of said pilot signal, second means for mixing a portion of said wave intercepted by said element with one of the sidebands produced by said first mixing means, and means for applying a sideband produced by said second mixing means that is in phase with sidebands produced by said second mixing means associated with the other antenna elements to said utilization means.

6. A communication system comprising an antenna array, a remotely located source of electromagnetic waves impinging upon said array, a source of information to be transmitted from said array to said remotely located source, a local source of pilot signals, means for mixing said pilot signal with a portion of the electromagnetic wave from said remotely located source intercepted by one element of said array, and apparatus individual to each element of said array with the exception of said one element comprising first means for mixing one of the sidebands produced by said last-mentioned mixing means with a portion of electromagnetic wave from said remotely located source intercepted by said antenna element, means for separating a sideband produced by said first mixing means oscillating at the frequency of said pilot signal, second means for mixing said separated sideband with the output from said source of information, and means for transmitting from said element a sideband of said second mixing means the relative phase of which is opposite in sense and proportional in magnitude, in the ratio of frequency of impinging wave to frequency of transmitted wave, to the phase of said intercepted portion of said impinging wave.

7. In a communication system, a station comprising a plurality of antenna elements arranged in an array, a source remotely located from said station for irradiating said array with electromagnetic waves, a local oscillator, means for mixing the output of said oscillator with a portion of said irradiating wave intercepted by a first one of said elements, the sum frequency sideband resulting constituting a reference signal, means for mixing said reference signal with a portion of said electromagnetic wave intercepted by each of the remaining of said antenna elements, the difference frequency resulting constituting a direction-indicating signal, a source of information to be radiated from said array in the direction of said remotely located source, means for mixing the output from said information source with each of said direction-indicating signals, means for applying each sum frequency sideband resulting from said last-defined mixing means to the associated antenna element of said array, means for mixing a portion of said wave intercepted by each of the remaining of said antenna elements with the associated direction-indicating signal, and means for combining the sum frequency sidebands resulting from said last-mentioned mixing means.

8. In a communication system, an array of antenna elements, a remote source of electromagnetic waves for illuminating said array, a source of information signals to be transmitted from said array to the location of said illuminating source, a local source of sine wave signals, utilization means, apparatus associated with a first one of said antenna elements comprising first means for mixing said sine wave signal with a portion of the electromagnetic wave intercepted by said first element, means for applying one of the sidebands resulting from said first mixing means to said utilization means, second means for mixing said sine wave signal with the output from said information source, and means for applying one of the sidebands resulting from said second mixing means to said one antenna element, and apparatus individual to each element of said array with the exception of said one element comprising third means for mixing said one sideband resulting from said first mixing means with a portion of the electromagnetic wave from said remotely located source intercepted by said element, means for separating a sideband produced by said third mixing means oscillating at the frequency of said pilot signal, fourth means for mixing said separated sideband with said output from said information source, means for transmitting from said element a sideband of said second mixing means the relative phase of which is opposite in sense and proportional in magnitude to the relative phase of said intercepted portion of said impinging wave, fifth means for mixing a portion of said wave intercepted by said element with one of the sidebands produced by said third mixing means, and means for applying a sideband produced by said fifth mixing means that is in phase with sidebands produced by said fifth mixing means associated with the other antenna elements to said utilization means.

9. A communication system comprising an array of antenna elements, a remotely located source of electromagnetic waves for irradiating said array, a source of signals to be radiated toward said remote source, regular apparatus associated with a first of said antenna elements comprising a local source of pilot signals, first means for mixing said pilot signal with a portion of said electromagnetic wave intercepted by said element, spare apparatus associated with a second of said antenna elements comprising a local source of pilot signals, second means for mixing said last-mentioned pilot signal with a portion of said electromagnetic wave intercepted by said second element, third means for mixing one of the sidebands produced by said first mixing means with a portion of electromagnetic wave intercepted by each of the remaining antenna elements, fourth means for mixing a sideband of each of said third mixing means oscillating at the frequency of said pilot signal with the signal from the source of signals to be radiated toward said remote source, means for applying to each of said antenna elements a sideband of said fourth mixing means the phase of which is opposite in sense and related in magnitude to the phase of the portion of said electromagnetic wave intercepted by said element, and means upon diminution by a predetermined quantity of said sideband produced by said first mixing means for substituting a sideband of said second mixing means for said sideband of said first mixing means applied to said third mixing means.

10. A communication system comprising an array of antenna elements, a remotely located source of electromagnetic waves for irradiating said array, a source of signals to be radiated toward said remote source, regular apparatus associated with a first of said antenna elements comprising a local source of pilot signals, and first means for mixing said pilot signal with a portion of said electromagnetic wave intercepted by said element, spare apparatus associated with a second of said antenna elements comprising a local source of pilot signals, and second means for mixing said last-mentioned pilot signal with a portion of said electromagnetic wave intercepted by said second element, third means for mixing one of the sidebands produced by said first mixing means with a portion of electromagnetic wave intercepted by each of the remaining antenna elements, fourth means for mixing a sideband of each of said third mixing means oscillating at the frequency of said pilot signal with the signal from the source of signals to be radiated toward said remote source, means for applying to each of said antenna elements a sideband of said fourth mixing means the phase of which is opposite in sense and related in magnitude to the phase of the portion of said electromagnetic wave intercepted by said element, and means, upon failure of said regular apparatus to produce said sideband for substituting said spare apparatus for said regular apparatus.

No references cited.

KATHLEEN H. CLAFFY, *Primary Examiner.*

CHESTER L. JUSTUS, *Examiner.*